United States Patent
Lee et al.

(10) Patent No.: US 8,290,718 B2
(45) Date of Patent: Oct. 16, 2012

(54) BRIDGE MONITORING AND SAFETY EVALUATION METHOD USING A VIBRATION TECHNIQUE

(75) Inventors: Wei-Feng Lee, Taipei (TW); Cheng-Hsing Chen, Taipei (TW); Chia-Feng Chang, Taipei County (TW); Hsing-Tai Mei, Taipei County (TW)

(73) Assignee: Wei-Feng Lee, Taipei (TW)

( * ) Notice: Subject to any disclaimer, the term of this patent is extended or adjusted under 35 U.S.C. 154(b) by 443 days.

(21) Appl. No.: 12/652,330

(22) Filed: Jan. 5, 2010

(65) Prior Publication Data

US 2010/0242609 A1    Sep. 30, 2010

(30) Foreign Application Priority Data

Mar. 26, 2009 (TW) ................. 98110011 A
May 1, 2009 (TW) ................. 98114646 A

(51) Int. Cl.
*G01M 5/00* (2006.01)
*G01M 7/00* (2006.01)
*G06F 17/40* (2006.01)
*G06F 19/00* (2006.01)

(52) U.S. Cl. ............... 702/34; 73/577; 73/594; 73/786; 73/865.8; 702/56; 702/113; 702/187; 702/189

(58) Field of Classification Search .......... 73/570, 73/577, 584, 594, 760, 786, 788, 865.8; 702/1, 702/33, 34, 35, 56, 108, 113, 127, 187, 189; 703/1, 6, 7

See application file for complete search history.

(56) References Cited

U.S. PATENT DOCUMENTS

| | | | |
|---|---|---|---|
| 6,341,258 B1 * | 1/2002 | Inoue et al. ............... | 702/56 |
| 6,397,153 B1 * | 5/2002 | Yamagishi et al. ......... | 702/42 |
| 6,629,042 B2 * | 9/2003 | Yamagishi et al. ......... | 702/42 |
| 6,718,270 B2 * | 4/2004 | Horiuchi et al. .......... | 702/56 |
| 6,763,311 B2 * | 7/2004 | Inoue et al. ............... | 702/56 |
| 2002/0059034 A1 * | 5/2002 | Inoue et al. ............... | 702/56 |
| 2002/0116136 A1 * | 8/2002 | Yamagishi et al. ......... | 702/41 |
| 2003/0055582 A1 * | 3/2003 | Horiuchi et al. .......... | 702/56 |

FOREIGN PATENT DOCUMENTS

| | | | |
|---|---|---|---|
| JP | 2010-229807 A | * | 10/2010 |
| TW | 430062 U1 | * | 4/2001 |
| TW | 517734 U1 | * | 1/2003 |
| TW | 1273154 B | * | 2/2007 |
| TW | 200819594 A | * | 5/2008 |

* cited by examiner

*Primary Examiner* — Edward Cosimano
(74) *Attorney, Agent, or Firm* — Muncy, Geissler, Olds & Lowe, PLLC

(57) ABSTRACT

The invention relates bridge structure safety evaluation technology by means of combining vibration measuring and structural model analysis techniques for bridge erosion evaluation and pre-warning monitoring applications. This technology can also be applied for long-term bridge structure monitoring and safety evaluation as well as judgment and evaluation of rail structure abnormality.

11 Claims, 8 Drawing Sheets

BRIDGE MONITORING AND SAFETY EVALUATION METHOD USING A VIBRATION TECHNIQUE

BACKGROUND OF THE INVENTION

1. Field of the Invention

The present invention relates to bridge structure monitoring and safety evaluation technology applicable for bridge maintenance management and more particularly, to such a bridge monitoring and safety evaluation method, which employs specific vibration measuring and analysis techniques to analyze the structural stability of a bridge and then to evaluate the life cycle of the structure of the bridge so as to further achieve a bridge health inspection and long-term bridge behaviors monitoring analysis.

2. Description of the Related Art

Most rivers in Taiwan have the characteristics of steep slope and quick water. Under the impact of heavy rainfall or typhoon with flood, river beds are seriously destroyed, causing exposure of the piers and foundation of the bridges. Continuous erosion results in tilt and damage of the bridge pier foundations or even bridge collapse.

Known bridge erosion studies and prevention techniques are created based on one single technique or one single physical method. More particularly, most conventional bridge foundation erosion examining and monitoring methods employ ultrasonic waves, gravity and fiber optical measuring techniques to detect the depth of erosion, water depth and other environmental conditions. For example, Taiwan Utility Model Patent Application No. 89203602 discloses a gravity type erosion measurement device, which uses a rope to extend a weight along a fixed sleeve to the erosion surface and to measure the depth of erosion by means of letting off and taking up the rope. Taiwan Utility Model Patent Application No. 91204412 discloses an optical fiber measuring technique that provides a riverbed sediment monitoring device, which uses a flexible rod member carrying a fiber bragger grating sensor therein for erecting in the riverbed. When the riverbed reaches a predetermined elevation, the fiber bragger curves, and a related physical amount of variation indicative of the erosion depth is obtained through an analyzer. Taiwan Invention Patent Application No. 94102692, entitled "Water guide type bridge erosion prevention device", teaches the use of water guide means to guide water upwards or sideways, preventing down flow of water in washing away riverbed. The washout prevention effect reaches 50%-70%. Taiwan Invention Patent No. 96123632 discloses "Monitoring device for monitoring bridge foundation and riverbed erosion, remote automatic monitoring system and bridge with automatic monitoring function". This invention uses a gravity survey rod to measure the depth of erosion and a protective sleeve to enhance the strength against impact of drifting objects, and finally uses a signal pickup unit to pick up the sliding distance between the gravity survey rod and the protective sleeve and to convert the signal into a digital signal for transmission to a remote control center.

The aforesaid prior art inventions have the following technical blind spots:

1. The objects to be measured are the environmental conditions around the bridge, such as the erosion depth and water depth. These environmental conditions are indirect conditions for structural stability analysis. Simply obtaining the real time data of these environmental conditions still cannot rapidly and accurately known the safety conditions of the bridge structure.

2. In actual practice, the security and durability of the devices of the prior art techniques are doubtful. The devices of the prior art techniques need to be dipped in water or embedded in the riverbed. They may be unable to effectively perform the measurement or to survive under the impact of quick water, rocks, drifting objects and down flow of water.

3. Because the objects to be measured are environmental conditions, the aforesaid prior art techniques cannot get the bridge structure long-term variational trend or effectively respond to the actual bridge structure critical condition after several catastrophe events.

SUMMARY OF THE INVENTION

The present invention has been accomplished under the circumstances in view. It is the main object of the present invention to provide a bridge monitoring and safety evaluation method, which combines vibration measuring and structural model analysis techniques.

The bridge monitoring and safety evaluation method including:

a) using a train (rail vehicle) or car (road vehicle) running over the bridge as a vibration source to measure the vibration modes of the bridge structure for evaluating the functioning of the bridge structure;

b) using a three-dimensional vibrator sensor to measure the vibration reactions of the structural components of piers and floor of the bridge induced by the vibration source in the vehicle running direction, the direction perpendicular to the vehicle running direction and the gravity direction;

c) using the design and construction data of the bridge, the current bridge inspection data and temperature and other environmental data to establish a bridge structure model for analyzing the bridge structure basic modes and critical modes;

d) analyzing vibration test results for comparison with structure model analysis results to evaluate the bridge structure safety and structural stability;

e) using the above measuring and analysis results to establish the relationship between bridge structure critical conditions (such as critical erosion depth, structural integrity) and bridge structure vibration frequency for bridge erosion evaluation and pre-warning monitoring applications and for long-term bridge structure monitoring and safety evaluation as well as judgment and evaluation of rail structure abnormality;

f) using the aforesaid techniques of the invention for the creation of bridge real-time erosion pre-warning and long-term structure health evaluation apparatus. The main concept is to build the estimation logic and criteria of the content of item e) in a microcomputer chip and then to integrate the microcomputer chip with water lever sensor means, accelerator means, temperature sensor means and tilt sensor means to form an intelligent monitoring system. This intelligent monitoring system is mainly for measuring bridge structure vibration modes and judging the stability of the bridge on the real time, thereby achieving the objective of bridge safety pre-warning.

The invention has the characteristics as follows:

a) The use of a running vehicle as a vibration source eliminates the problems of insufficient scale and energy of vibration source and operation instability.

b) Real time reaction:

i) High stability of vibration signal, ease of analysis operation; applicable for time domain analysis, spectrum analysis and etc.

ii) Intelligent monitoring system concept with the integration of measuring results from different apparatus for structure analysis matching to greatly improve judging efficiency.
iii) Unlike water level sensor, erosion measuring apparatus and other regular indirect environmental monitoring apparatus, the high stability of the system of the invention allows for direct monitoring.

c) Durability
i) Vibration measuring and apparatus monitoring can be performed on the pier cap or floor of the bridge, far away from the source of damage such as impact of flood, sand and mud, stones or drifting objects, assuring high durability and measuring accuracy.
ii) High apparatus precision and quality controllability facilitates system maintenance and assures a high level of system safety.

d) Wide application range.

The measuring results can be used directly for bridge safety evaluation:

1) The invention can be applied for monitoring environmental change and structural stability.
2) The invention can be applied for monitoring typhoon rainfall, i.e., for use as a monitoring pre-warning system.
3) The invention can be applied for judging structural stability after an event.
4) The invention can be applied for verifying the effects of bridge structure repair and rehabilitation.
5) The invention can be applied for long-term monitoring, evaluation of bridge structural behaviors and maintenance management.

DETAILED DESCRIPTION OF THE INVENTION

Figure 1:
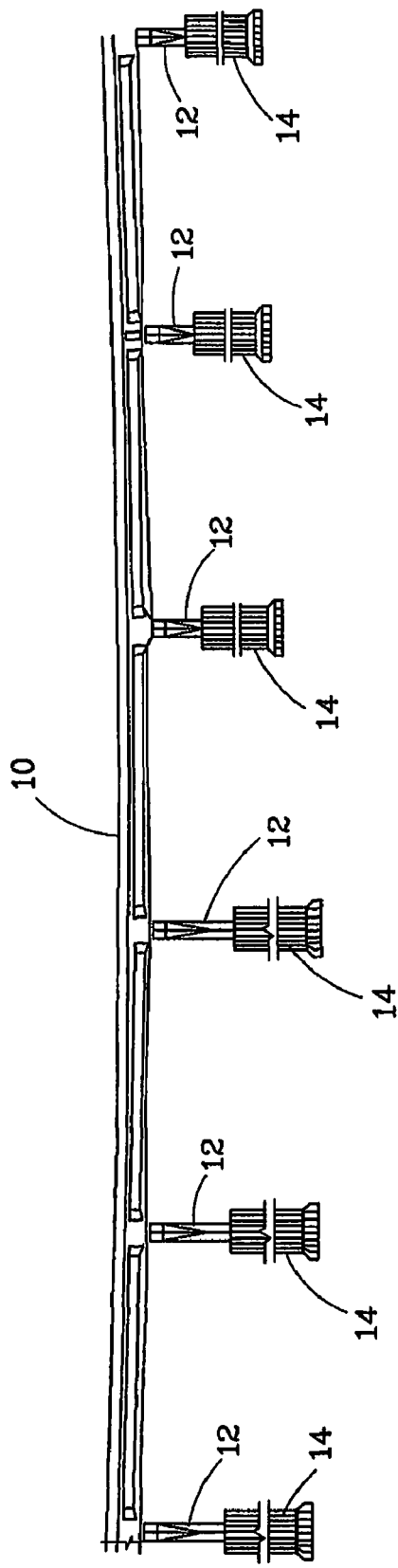
FIG. 1 is a schematic drawing showing the structure of a regular bridge.
Figure 4:
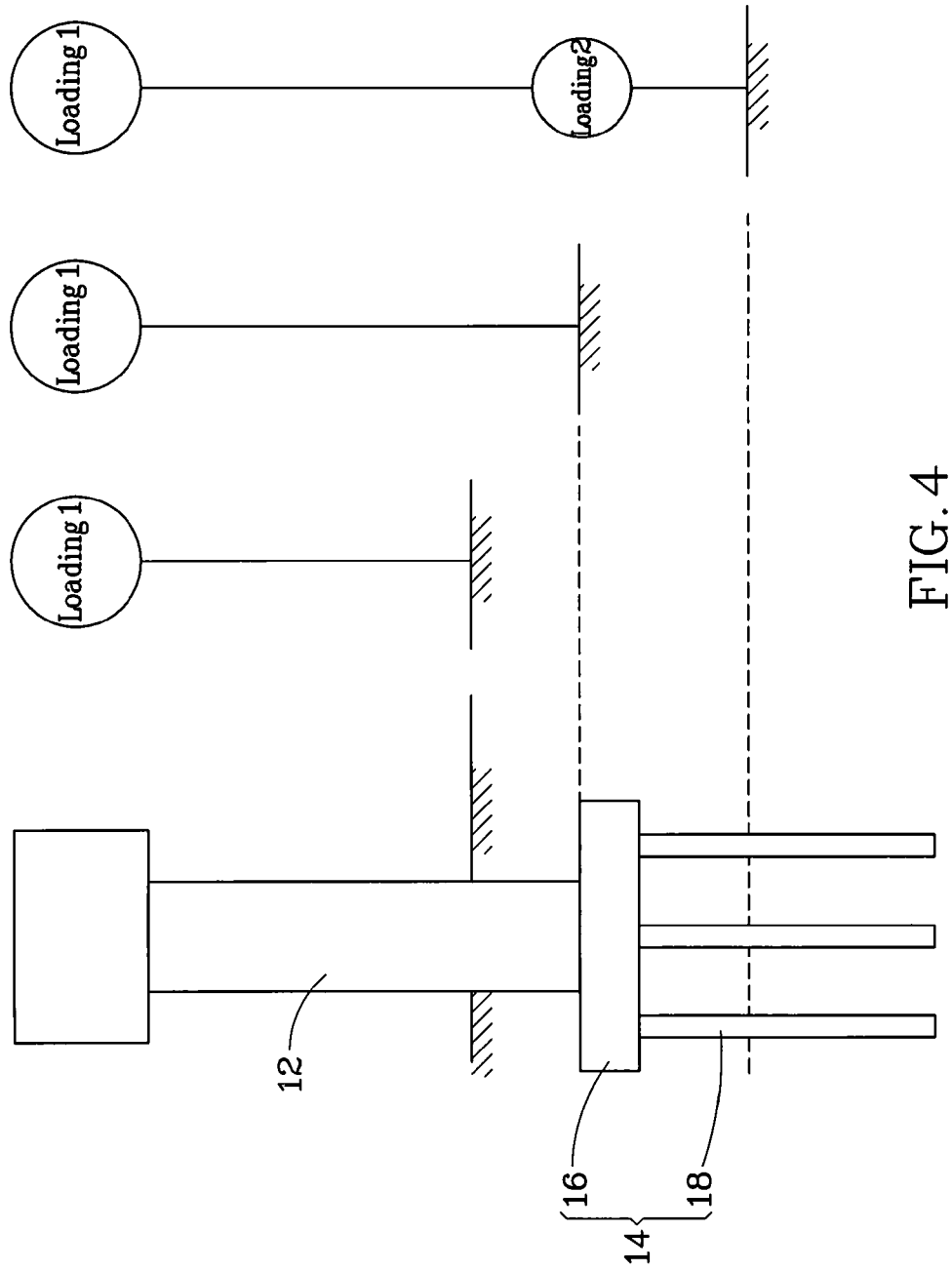
FIG. 4 is a schematic drawing showing the relationship between change of the length of bridge pier and vibration frequency.

Before explanation of the method of the present invention, we should define the parts of a regular bridge. As shown in FIG. 1, a regular bridge comprises a bridge floor 10 for the passing of vehicles, a plurality of bridge piers 12 disposed at the bottom side of the bridge floor 10 and a bridge foundation 14 arranged at the bottom side of each bridge pier 12 and embedded in the soil. Referring to FIG. 4, a regular bridge foundation 14 comprises a footing 16 and a plurality of piles 18. The bridge foundation 14 may be constructed either in a first manner where the footing 16 and the piles 18 are embedded in the soil or a second manner where the piles 18 are embedded in the soil and the footing 16 is disposed above the soil. When designing a bridge with only the piles 18 to be embedded in the soil, the contribution of the footing 16 to load bearing and lateral resistance may be neglected. Therefore, when the soil around the bridge foundations 14 is being carried away by running water, the effect of soil loss on the bearing capacity and lateral resistance in the design having the footing 16 and piles 18 of each bridge foundation 14 embedded in the soil is relatively greater than in the design having only the piles 18 of each bridge foundation 14 embedded in the soil.

Figure 2:
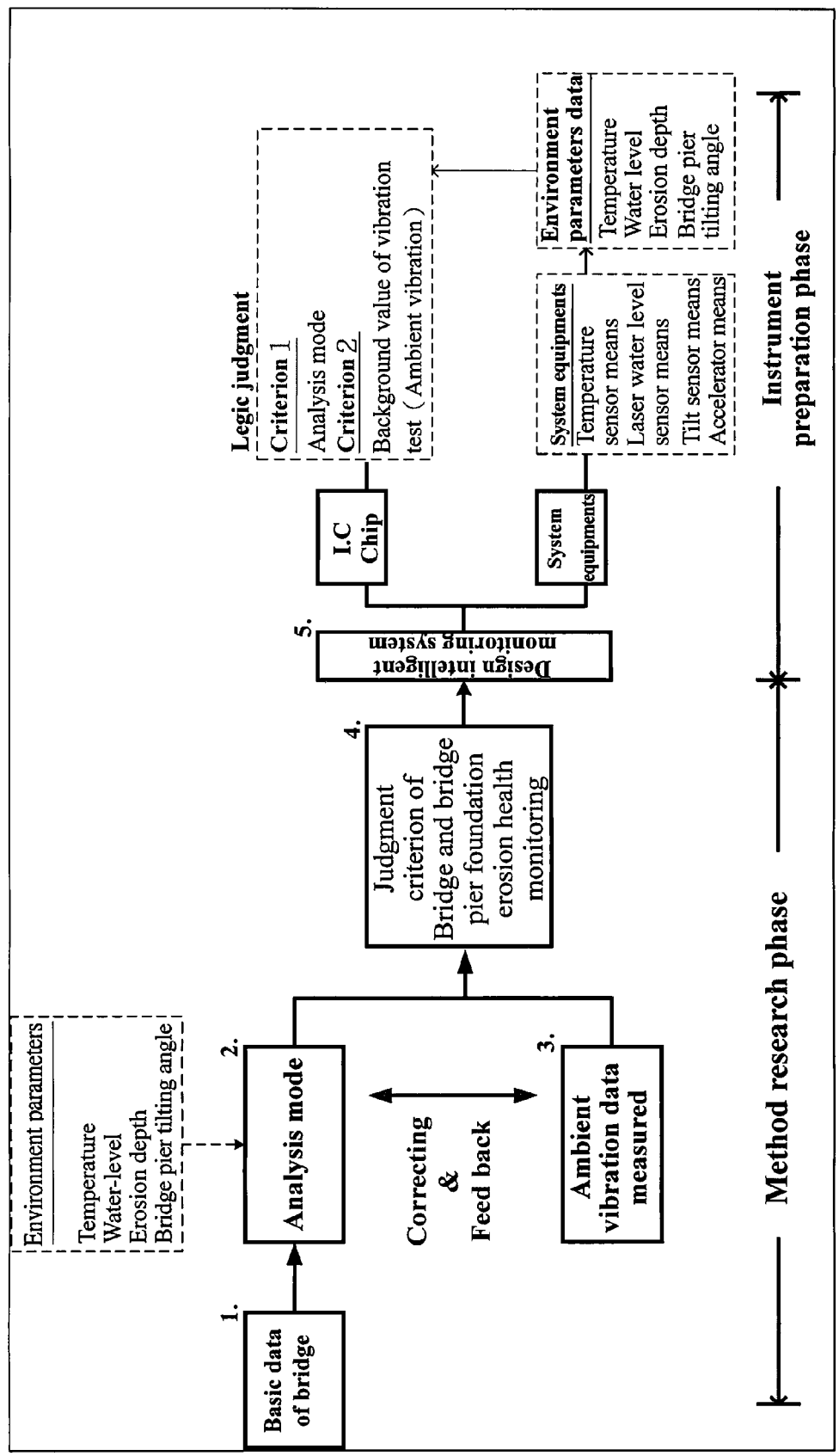
FIG. 2 is a flow chart of a bridge monitoring and safety evaluation method in accordance with the present invention.

Referring to FIG. 2, a bridge monitoring and safety evaluation method in accordance with the present invention comprises the steps of:

a) obtaining the basic data of the target bridge and establishing a bridge structure analysis model subject to the basic data obtained where the basic data includes the structural type of the bridge, the type of the bridge foundation and the type of the bridge piers; the basic data is used for the analysis of the behaviors of the bridge including basic structure vibration modes, load-bearing conditions and bridge collapse critical conditions, so as to establish a bridge structure analysis model as shown as reference legend 1 in FIG. 2;

b) starting an initial vibration measurement to measure the real behavior of the bridge and to compare the measured data with the structure analysis model for analysis as shown as reference legend 3 in FIG. 2;

c) correcting the structure analysis model and making a judgment criteria so as to establish the relationship between the bridge foundation erosion depth and bridge pier vibration frequency and then to estimate the bridge warning threshold as shown as reference legend 2 in FIG. 2;

d) establishing an intelligent bridge monitoring system as shown as reference legend 5 in FIG. 2; and e) monitoring the bridge over a long period of time to collect data and to feed back the data for correcting the judging standard as shown as reference legend 4 in FIG. 2, and then repeating step d) and e), and then repeating steps d) and e).

The details of the aforesaid steps are as described hereinafter:

1. Obtain the Basic Data of the Bridge and the Related Environment Parameters so as to Establish a Bridge Structure Model:

The basic data of the bridge includes: the geographic location of the bridge, the river system on which the bridge is built, bridge completion diagram, geological borehole report, hydrological data and related analysis parameters. The data of the geographic location of the bridge is used for judging the importance and rating of the bridge. The data of the river system on which the bridge is built is for understanding the erosion characteristics of the river so that different analysis can be performed subject to different characteristics. The data of bridge completion diagram is for understanding the structural type of the bridge, the type of the bridge foundation and the type of the bridge piers, including the height of each bridge pier, foundation embedded depth, the type of the upper structure, single-span beam or multi-span beam type for further structural analysis. The data of geological soil parameters is for basic analysis and establishment of bridge basic structural model. The hydrological data is for checking the environmental changes of the surroundings and related rainfall amount for estimating changes of the riverway.

The environmental parameters include the data of: temperature variation of the bridge piers, the water-level elevation, the erosion depth under the action of a heavy rain and the bridge pier tilting angle.

Figure 3:
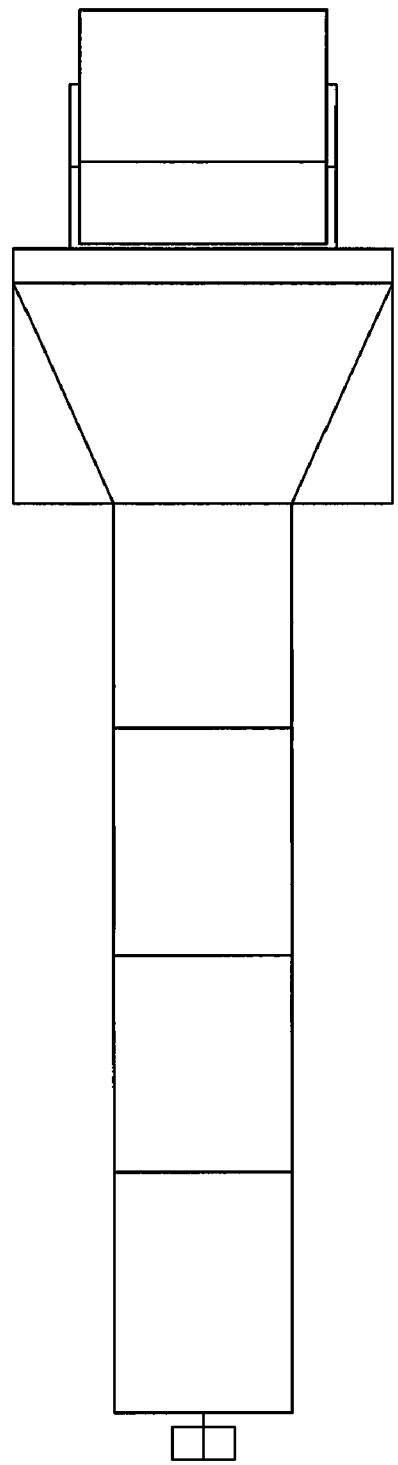
FIG. 3 illustrates a bridge pier structure model made according to the present invention.

Establish an initial structural model for the bridge by means of using the bridge's completion diagram and geological borehole report, as shown in FIG. 3. The parameters required are structural type and size. Use the geological borehole report to establish an interacted soil spring matrix between the foundation and the soil (for simulating the soil), including bridge vibration unit and foundation pier column. By means of the structural model, the initial basic parameters of the bridge such as vibration modes and loading conditions are obtained.

Further, by means of changing the bridge pier length to run a modal analysis can establish mode shape functions and the vibration frequencies of different bridge modes. Normally, when a bridge is damaged due to an external force, the structural stiffness will be changed. A structural stiffness change is apparently presented in its vibration frequency. Therefore, when the frequency of the bridge pier column is changed abnormally, the safety performance of the bridge can be judged a danger.

2. Vibration Test:

Vibration test must be performed on the bridge. The objective of the vibration measurement is mainly to find out the vibration frequency of different lengths of bridge piers when the vibration source passes through the bridge floor.

During measurement, use a vibration source to pass through the bridge and then measure the vibration frequency of the bridge pier foundation (including long piles and short piles).

Generally, bridge structural model and vibration test can be separately performed. The performing sequence is not important.

3. Correct the Model and Make Judgment Criteria so as to Establish the Relationship Between the Structural Safety and Bridge Pier Column Vibration Frequency:

In the present invention, the said structural safety indicates the critical erosion depth analysis and structural integrity. Other bridge structure safety indexes such as foundation integrity analysis or the like can also be put in the analysis of the present step.

Foundation erosion model is applicable for the analysis of the lower part structure and its relationship with the water level during the erosion. The parameters required are: bridge foundation type and size, soil survey geographic data and variation of river water level.

With respect to the analysis of the foundation erosion model, input design layer data and pier strength parameters, and then run erosion depth simulation test to find out the critical erosion depth by means of employing a pier stability analysis.

With respect to the structural integrity analysis, use the vibration test data obtained from the bridge to evaluate the stiffness matrix of the current conditions of the structure of the bridge. When the structural stiffness is lowered, it means the structural integrity is poor. The result of this analysis can be used for reference in further bridge rehabilitation.

In the aforesaid bridge structural safety analysis, one, two or all the three items can be analyzed. Other analysis useful as a bridge structure safety index can be performed at this stage.

Thereafter, integrate all the data regarding the relationship between the short and long piles of the bridge pier foundation and the frequency. As shown in FIG. 4, there is a linear relationship between the length of the bridge pier and the vibration relationship. Normally, the shorter the bridge pier is the higher the vibration frequency will be. Based on this relationship, the invention estimate the erosion depth, structural integrity and (or) the relationship between the foundation integrity and the vibration frequency.

After establishment of this bridge relationship diagram, start to establish the bridge warning threshold value. When the frequency is reduced to the set warning threshold value, it represents the structural stiffness of the bridge has been reduced significantly to a damaged status and an emergent crisis management must be started.

Similarly, we can establish the relationship between the vibration frequency and one or two or all the three of the erosion depth, structural integrity and foundation integrity.

EXAMPLE

The measuring performance on Bridge W and the measurement results are described hereinafter:

1. Test objects: Two pieces of caisson type bridge piers, including one long pile (height 10 m; depth of foundation caisson 10 m) and one short pile (height 7 m; depth of foundation caisson 10 m).

2. Vibration source: One test car (weight: 32 tons)

3. Vibration generation method: Drive the test car over the bridge floor at the speed of 30 km/hr, 45 km/hr and 60 km/hr respectively.

4. Locations of speed sensors: Arrange a speed sensor on each of four test points around each of the long pier and short pier, i.e., two sensors on the bridge floor, one on the pier cap and the other on the bottom side of the pier.

5. Number of tests: twice at every car speed, and make analysis on ambient vibration test, force vibration test and free vibration test.

Figure 5:
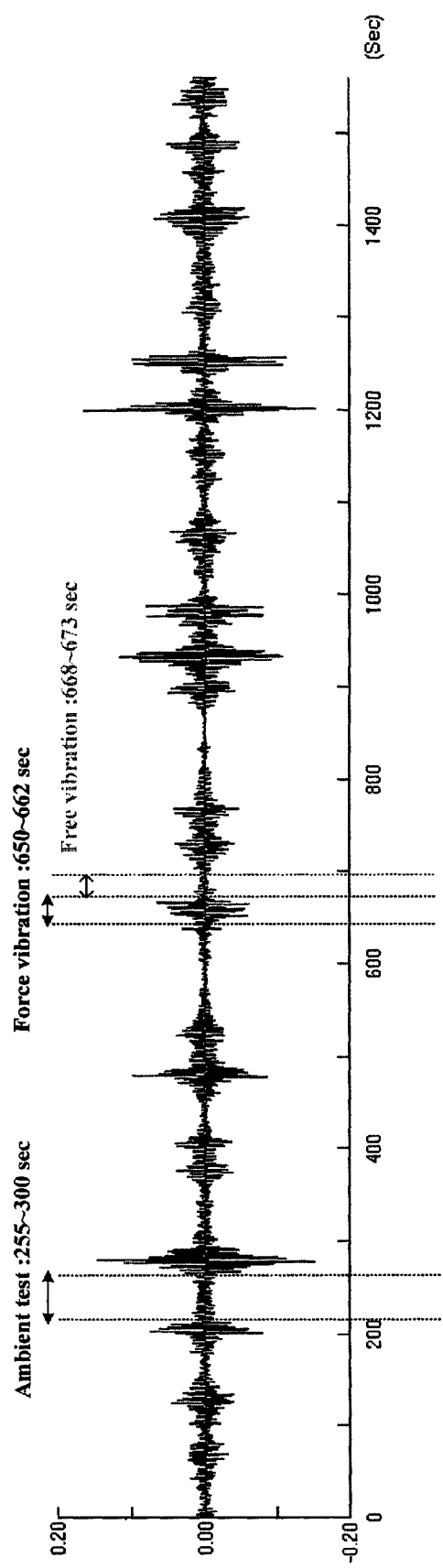
FIG. 5 illustrates the initial vibration test result time domain.

The ambient test is to pick up a time period of 255~300 seconds for analysis before passing of the test car, and the measuring interval of the ambient test is 45 seconds. The force vibration is to pick up a time period of 650~662 seconds for analysis during passing of the test car, and the time segment to be analyzed is 12 seconds. The free vibration is to pick up a time period of 668~673 seconds for analysis after passing of the test car, and the time segment to be analyzed is 5 seconds. The sample rate is 200 Hz. Employ FFT (Fast Fourier Transform) to obtain spectrum, and use zero padding during spectrum analysis. FIG. 5 shows the measuring result.

When all data are collected, make a cross match with the bridge structure modal analysis (to obtain vibration frequencies at different modes) of the aforesaid step b), finding the significant vibration frequency of the bridge at different lengths of piers.

Further, the ambient vibration data measured by using the initial vibration can be used as the basic initial vibration data of the bridge for further background reference value correction of frequency variation in case of any posterior environmental changes (such as temperature rise, water level rise, vehicle overload).

Figure 6:
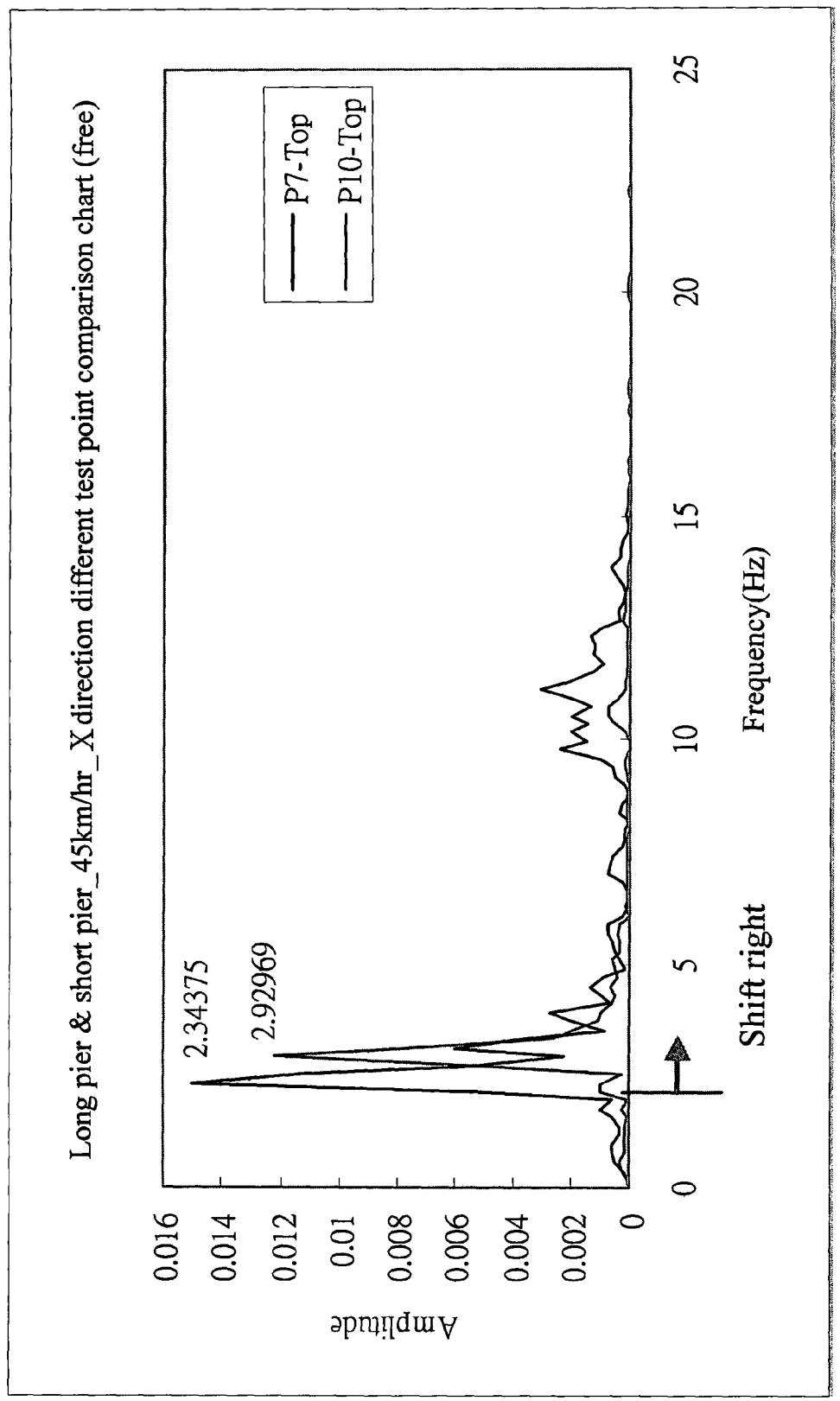
FIG. 6 illustrates variation of the relationship between different lengths of bridge piers and vibration frequency according to the present invention.
Figure 7:
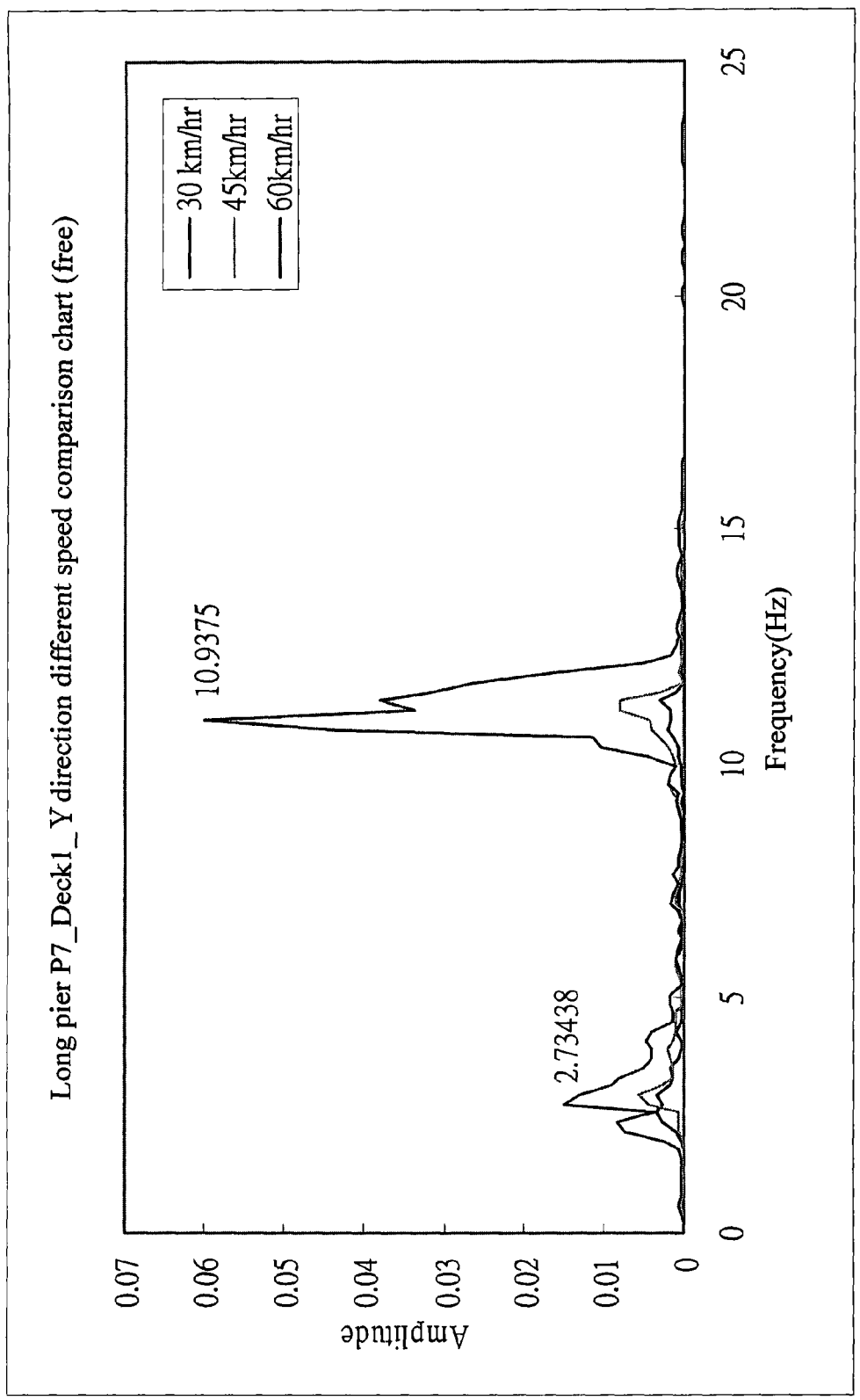
FIG. 7 illustrates the relationship of the vibration amplitude and different speeds according to the present invention.

Further, with respect to the integration of the relationship between long and short piles of the bridge foundations and the frequency, a pile length difference causes a change in frequency. As shown in FIG. 6, short piles show the tendency of a displacement toward high frequencies. As shown in FIG. 7, different car speeds simply cause a change in amplitude without affecting the frequency.

Figure 8:
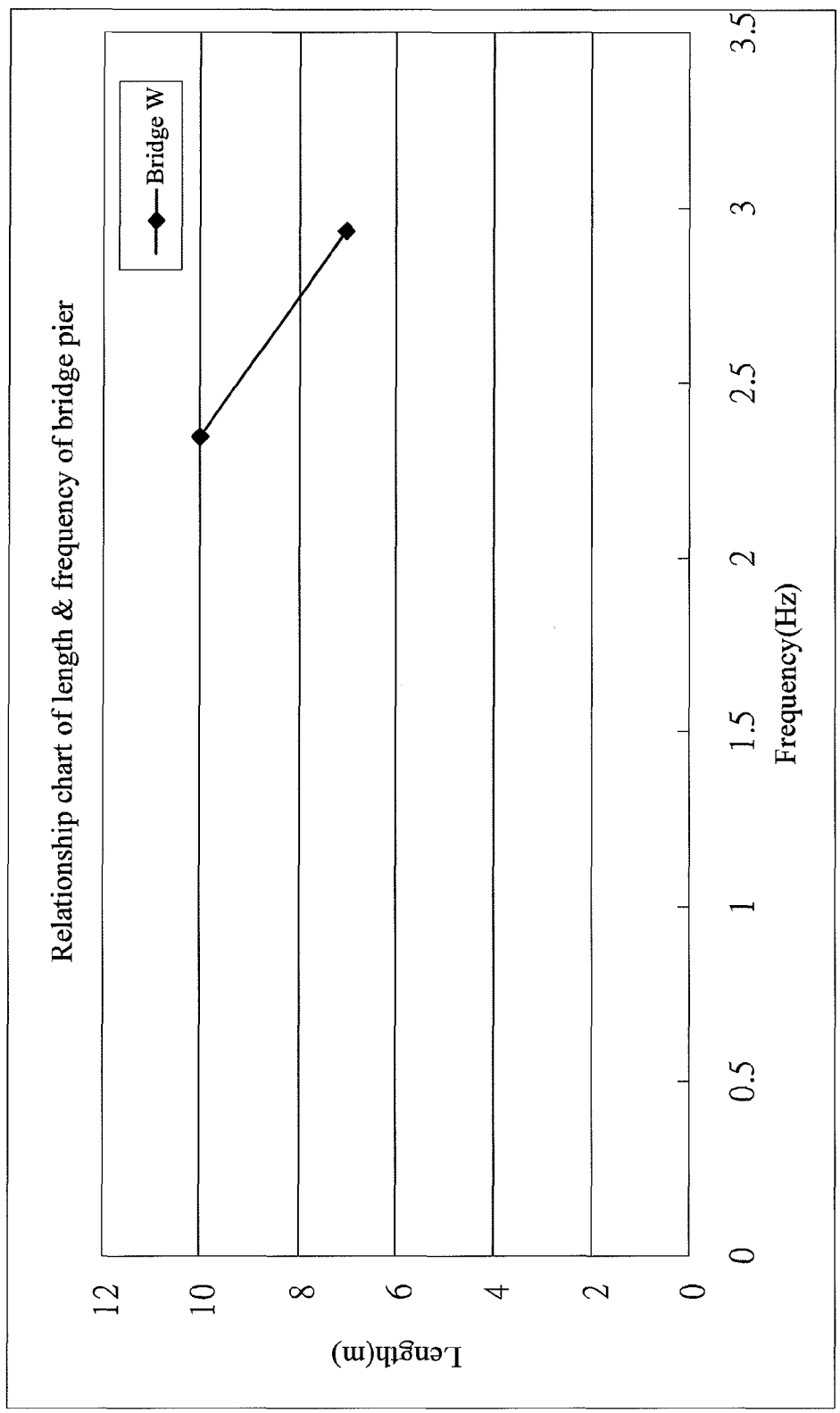
FIG. 8 illustrates the relationship between erosion depth and vibration frequency according to the present invention.

At final utilize the variation in bridge pier vibration frequency to estimate the variation in pier erosion. FIG. 8 illustrates the relationship between the pier length and the frequency. Thus, bridge failure frequency and depth of erosion can be predicted.

The technique of the present invention can also be applied for the creation of bridge real-time erosion pre-warning and long-term structure health evaluation apparatus. The main concept is to build the bridge structure safety conditions and vibration frequency estimation logic and criteria in a microcomputer chip and then to integrate the microcomputer chip with water lever sensor means, accelerator means, temperature sensor means and tilt sensor means to form an intelligent monitoring system. This intelligent monitoring system is mainly for measuring bridge structure vibration modes and judging the stability of the bridge on the real time, thereby achieving the objective of bridge safety pre-warning.

The invention is applicable but not limited to the following fields:

1. Monitoring of bridge environmental change and structural stability.
2. Real-time monitoring and pre-warning during typhoon rainfall.
3. Judgment of structural stability after an event.
4. Verification on the effects of bridge structure repair and rehabilitation.
5. Long-term monitoring and evaluation of bridge structural behaviors.

What is claimed is:

1. A bridge monitoring and safety evaluation method, comprising the steps of:
   a) obtaining the basic data of a bridge and using the basic data to make a bridge structural model and then performing a vibration test on the bridge structural model by means of using a vibration source to pass over the bridge at a predetermined speed and recording the vibration conditions of the bridge at specific locations; and
   b) using the test result of said vibration test to correct the bridge structural model and to establish judgment criteria and to further establish the relationship between the bridge structure safety and bridge pier vibration frequency for estimating a bridge warning threshold value.

2. The bridge monitoring and safety evaluation method as claimed in claim 1, wherein said bridge basic data includes the structural type of the bridge, the type of the foundations of the bridge and the type of the piers of the bridge.

3. The bridge monitoring and safety evaluation method as claimed in claim 1, wherein the step a) to obtain the basic data of the bridge comprises the sub step of obtaining environmental parameters, said environmental parameters comprising the temperature, water level and depth of erosion around the bridge piers and the tilt angles of the bridge piers.

4. The bridge monitoring and safety evaluation method as claimed in claim 1, wherein the step a) to make a bridge structural model comprises the sub step of changing the bridge pier length to run a modal analysis and to further establish mode shape functions and the vibration frequencies of different bridge modes.

5. The bridge monitoring and safety evaluation method as claimed in claim 1, wherein said bridge structure safety comprises the depth of erosion for establishing the relationship between the critical erosion depth and bridge pier vibration frequency.

6. The bridge monitoring and safety evaluation method as claimed in claim 1, wherein said bridge structure safety comprises structural safety for establishing the relationship between the structural integrity and the bridge pier vibration frequency.

7. The bridge monitoring and safety evaluation method as claimed in claim 1, wherein the vibration source used during the performance of said vibration test is to drive a car to pass over the bridge at a predetermined speed.

8. The bridge monitoring and safety evaluation method as claimed in claim 1, wherein the vibration source used during the performance of said vibration test is to drive a rail vehicle to pass over the bridge at a predetermined speed.

9. The bridge monitoring and safety evaluation method as claimed in claim 1, wherein said vibration test is to have said vibration source to pass over said bridge at different speeds and to record the vibration at each speed.

10. The bridge monitoring and safety evaluation method as claimed in claim 1, wherein said specific locations include at least one location at the bridge floor, one location near the top of each bridge pier and one location near the bottom side of each bridge pier.

11. The bridge monitoring and safety evaluation method as claimed in claim 1, wherein the vibration conditions to be recorded during said vibration test include the vibration conditions before passing of said vibration source over said bridge, the vibration conditions during passing of said vibration source over said bridge and the vibration conditions after passing of said vibration source over said bridge.

* * * * *